Jan. 22, 1946.   H. FREEDMAN   2,393,319
SURGICAL INSTRUMENT
Filed March 31, 1943
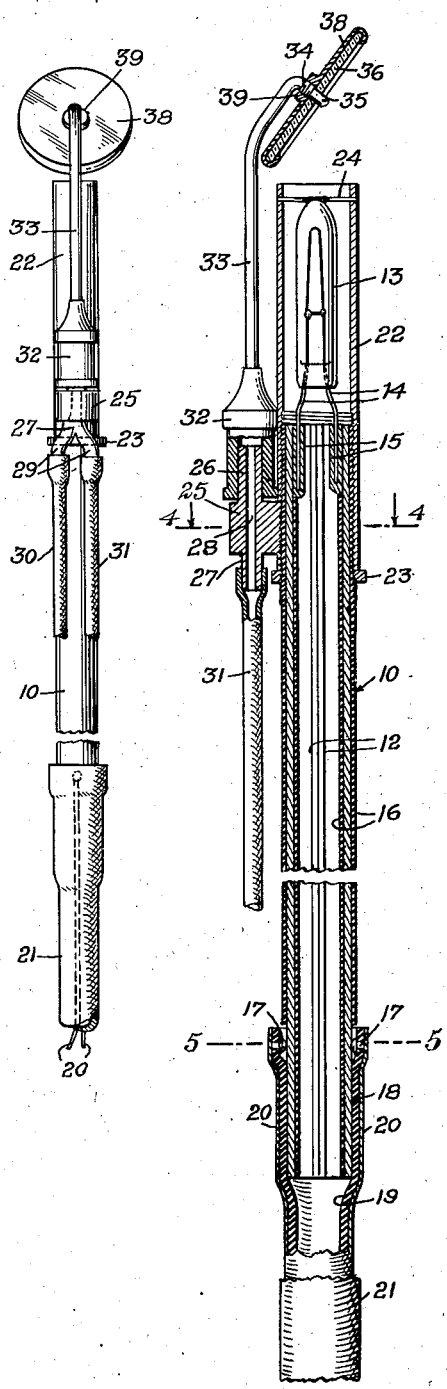
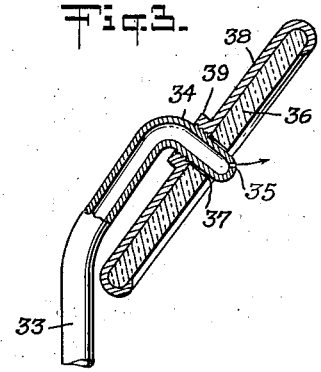
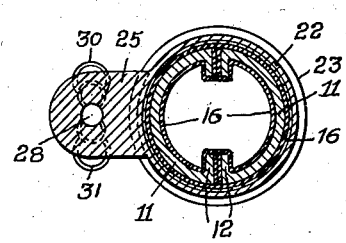
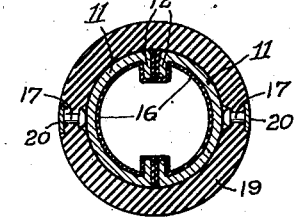
INVENTOR.
Hyman Freedman
BY
Mueller & Ruhl
Attorneys Patented Jan. 22, 1946

2,393,319

UNITED STATES PATENT OFFICE 2,393,319

SURGICAL INSTRUMENT

Hyman Freedman, New York, N. Y., assignor of one-half to Bertha Freedman, New York, N. Y.

Application March 31, 1943, Serial No. 481,245

10 Claims. (Cl. 32—33)

This invention relates to improvements in surgical instruments and has particular reference to an appliance employed for diagnostic purposes, such as in dentistry.

The use of a mirror in conducting examinations of the oral cavity has long been standard practice in the dental art and, as long as this procedure has existed, one of the difficulties thereof has been caused by fogging of the mirror when in the patient's mouth, necessitating frequent withdrawals and cleansing of the mirror during the course of an examination or operation upon the dental structure. Also, it is often necessary, during the course of such examinations or operations, to clear a cavity or the like of any foreign substances by the injection of a fluid, either air or water, which is sprayed into said cavity, after which the mirror is employed to examine the affected area, or an explorer or dental drill is used. Heretofore, because of the lack of a single instrument to accomplish a mirror examination and cleansing operation concurrently and the fact that the dentist has only two hands to work with, it has not been possible to perform any other operation while employing the mirror and clearing the affected area with a spray.

In accordance with the present invention, it is proposed to overcome the above difficulties by the provision of a novel instrument of practical construction capable of manipulation with one hand and by means of which the cleansing and examination of an affected area may be accomplished with the absolute avoidance of a misting or fogging of the mirror forming a part of said instrument, thereby enabling the performance of other operations and the concurrent and clear observance of the results thereof.

More specifically, the invention contemplates an instrument wherein a fluid injector tube supports and is so arranged with respect to a mirror that fluid may be sprayed in proximity to or away from the reflecting surface of said mirror and toward an affected area in such manner that the latter will be thoroughly cleansed and the breath of the patient will be prevented from fogging the mirror.

A further feature resides in mounting the injector tube and mirror upon a saliva ejector mouthpiece and containing within the latter a source of illumination the rays of light from which will be reflected by said mirror onto the part being examined, with said mouthpiece being so disposed relative to the orifice of the injector tube that the fluid, after impinging against the affected area, will be drawn, by suction, into said mouthpiece and around said source of illumination so as to materially reduce its temperature and thus avoid possible injury to the tissues of the mouth.

The inventive idea involved is capable of receiving a variety of mechanical expressions one of which, for purposes of illustration, is shown in the accompanying drawing; but it is to be expressly understood that said drawing is used only for the purpose of facilitating the description of the invention as a whole and not to limit the scope thereof, reference being had to the appended claims for this purpose.

In the drawing:

Fig. 1 is an elevational view of a surgical instrument constructed in accordance with the present invention.

Fig. 2 is an enlarged vertical longitudinal section through the instrument.

Fig. 3 is a further enlarged section taken through a portion of the injector tube and the mirror mounted thereon.

Fig. 4 is a transverse section on the line 4—4 of Fig. 2, and

Fig. 5 is a similar section on the line 5—5 of Fig. 2.

Referring more particularly to the accompanying drawing, the numeral 10 indicates, generally, an ejector tube which is constructed in a somewhat similar manner to the ejector tube shown in my patent dated September 9, 1941, and bearing #2,255,657. Said tube 10 comprises two longitudinal sections 11 each of semi-circular formation in cross section and provided with inturned flanges 12 along their edges that are opposed to each other when the sections are assembled. These sections, as in said patent, are utilized as electrical conductors for supplying current to a source of illumination, such as the small incandescent lamp 13 supported by said tube by the insertion of the wires 14 of the lamp into the sockets 15 formed at one end of the tube interiorly thereof. Before the sections 11 are assembled to form the tube, the greater portions of the lengths thereof are suitably coated with a covering 16 of insulating material on both the inner and outer surfaces of the sections. The outer covering of insulation extends to a point short of the lower ends of the sections so that when the latter are assembled to form the tube, the bared outer surface of the lower end of the tube will be capable of electrical contact with the terminals 17 carried by the upper end of the tube mounting 18, and each engaging one of the sections 11. Said mounting may comprise a length of rubber hose 19 grooved to receive the conducting strips 20 connected to the terminals 17 and held in position by the fabric covering 21, said strips 20 being joined to a source of current (not shown). Thus, a circuit is established for the lamp 13 in any position of rotation of the tube 10 relative to its mounting.

In accordance with the present invention, the tube 10, at its upper end, supports a sleeve member 22 which is threaded on the insulation 16 thereon and engaged with a collar 23 to properly position the sleeve on the tube so that the former will extend above the upper end of the tube and enclose the lamp 13, there being a cross wire 24 adjacent the outer end of said sleeve that engages the free end of the lamp to hold the latter steady and prevent its contact with said sleeve. This sleeve acts as a mouthpiece to be inserted into the oral cavity so as to draw saliva from the floor thereof when suction is created in the tube 10 and hose 19 in the usual manner.

Adjacent the lower end of the removable sleeve 22 the same has formed integrally therewith a mounting 25 having upper and lower reduced extensions 26 and 27, respectively, with a duct 28 extending through the latter and said mounting for a purpose which will appear. The extension 27 has two branches 29 to one of which is attached an air hose 30 while a water hose 31 is connected to the other branch. These hoses are connected to suitable sources of supply (not shown) from which air or water may be injected into the duct 28, at will. The extension 26 is adapted to receive thereon the socket 32 of the removable injector tube 33 which extends alongside of and beyond the outer end of the sleeve 22. At its outer end, the tube 33 is bent at an angle to the main portion thereof and said bent end is again bent to form a nozzle 34 having an orifice 35 therein extending at such an oblique angle to the longitudinal axis of the nozzle that the spray from the latter will be directed at substantially right angles to the stem or main portion of the injector tube and across the inlet end of the ejector tube. Said nozzle is externally screw threaded for receiving thereon the demountable mirror 36 having an aperture therein through which said nozzle projects with the outer extremity of the nozzle substantially in the plane of the mirror, the backing 38 of said mirror being provided with a threaded hub 39 engageable with the threads of said nozzle. The angle of the nozzle with respect to the adjacent or inlet end of the sleeve 22 is such that when the mirror is in position it is disposed obliquely to said main portion of the injector tube so that its reflecting surface will substantially face the inlet end of the ejector tube formed by the sleeve 22, and the rays of light from the lamp 13 mounted in said sleeve will be reflected in the proper direction for examination of an affected area, and the spray of either air or water will be properly directed toward said area for cleansing purposes. Also, the relationship between said nozzle and the inlet end of the sleeve 22 is such that the spray of air or water from the nozzle, after impinging against a tooth or the like will be within effective range of said inlet end so as to be drawn into the ejector tube when a suction is created therein. When air is thus injected and ejected, the oral cavity will be effectively cleared of fog which would otherwise impair the reflecting surface of the mirror. When water is injected and subsequently drawn into the sleeve 22, it will contact and pass around the lamp 13 and thus aid materially in reducing its temperature so that the heat therefrom will have no injurious effect upon the tissues of the mouth. Also, when conducting an examination with the mirror, a jet of air injected through the nozzle in a direction away from the reflecting surface of the mirror will avoid all tendency of the latter becoming fogged by the breath of the patient, thus eliminating the necessity of constantly withdrawing the mirror to clear the same.

What is claimed is:

1. In a surgical instrument, an ejector tube, a sleeve supported on one end thereof and forming an inlet for said tube, a source of illumination carried by said sleeve, a mounting affixed to one of the first two named elements, an injector tube removably supported on said mounting and having a nozzle at its outer end, and a mirror through which said nozzle extends, carried by said injector tube at an oblique angle thereto and with the reflecting surface of said mirror adjacent and substantially facing the outer end of said sleeve.

2. A surgical instrument comprising, a mirror and a substantially hollow supporting member having an open end portion adapted for connection with a fluid supply, and a closed end portion, an opening formed in the wall of the closed end portion adjacent the end thereof, the longitudinal axis of said opening being normal to the longitudinal axis of said open end portion, and means for mounting said mirror on said closed end portion, said mirror being disposed in a plane normal to the longitudinal axis of said closed end portion and non-parallel to the longitudinal axis of said open end portion.

3. A surgical instrument comprising, a mirror and a substantially hollow supporting member having an open end portion adapted for connection with a fluid supply and a closed end portion, an opening formed in the wall of the closed end portion adjacent the end thereof, and means for mounting said mirror on said closed end portion, the reflecting surface of said mirror lying in a plane substantially normal to the longitudinal axis of said closed end portion and non-parallel to the longitudinal axis of said open end portion, the closed end of said closed end portion lying substantially in the plane of said reflecting surface, and the orifice of said opening being disposed at an angle to said reflecting surface.

4. A surgical instrument as defined in claim 3, said mirror having a circular profile and being mounted on said closed end portion in co-axial alignment therewith.

5. A surgical instrument comprising, a mirror having a circular profile and a substantially hollow supporting member therefor, said supporting member comprising an open end portion adapted for connection with a fluid supply and a closed end portion, and means for detachably mounting said mirror on said closed end portion adjacent the closed end thereof and in co-axial alignment therewith, the reflecting surface of said mirror lying in a plane substantially normal to the longitudinal axis of said closed end portion and non-parallel to the longitudinal axis of said open end portion, the closed end of said closed end portion being disposed substantially in the plane of said reflecting surface, and the orifice of said opening being disposed at an acute angle with respect to said reflecting surface.

6. A surgical instrument comprising, a mirror and a substantially hollow supporting member therefor, said supporting member comprising an open end portion adapted for connection with a fluid supply, an intermediate portion whose longitudinal axis is disposed at an angle with respect to the longitudinal axis of said open end portion, and a closed end portion whose longitudinal axis is disposed normally with respect to the longitudinal axis of said intermediate portion, said mirror having a transversely extending centrally disposed aperture formed therein adapted to receive the closed end of said closed end portion, means for detachably mounting said mirror on said closed end portion, the reflecting surface of said mirror being disposed in a plane normal to the longitudinal axis of said closed end portion and non-parallel to said open end portion, an opening formed in the wall of said closed end portion at a point substantially adjacent said closed end, the longitudinal axis of said opening being disposed at right angles to the longitudinal axis of said open end portion.

7. A surgical instrument comprising, a mirror, a substantially hollow supporting member therefor, a substantially hollow handle member and means for securing said supporting member on said handle member, said supporting member having an open end portion adapted for connection with a fluid supply and a closed end portion having an opening formed in the wall thereof adjacent the terminal end thereof, means for mounting said mirror on said closed end portion, the reflecting surface of said mirror being disposed in a plane normal to the longitudinal axis of said closed end portion and non-parallel to the longitudinal axis of said open end portion, said opening having a longitudinal axis disposed at right angles to the longitudinal axis of said open end portion, said handle member having an open end disposed adjacent the reflecting surface of said mirror, the other end of said handle member being adapted for connection with suction means.

8. A surgical instrument as defined in claim 7, and valve means for controlling the admission of said fluid supply to said open end portion of said supporting member.

9. A surgical instrument as defined in claim 7, and a source of light disposed in said handle portion adjacent the open end thereof.

10. A surgical instrument as defined in claim 7, valve means for controlling the admission of said fluid supply to said open end portion of said supporting member, a source of light disposed in said handle member adjacent the open end thereof, and means for supporting said light in spaced relationship with respect to the inner wall surface of said handle member.

HYMAN FREEDMAN.